Nov. 26, 1968  A. R. MILLS  3,412,505
AXLE SUPPORT FOR TOY VEHICLES
Filed Dec. 16, 1965
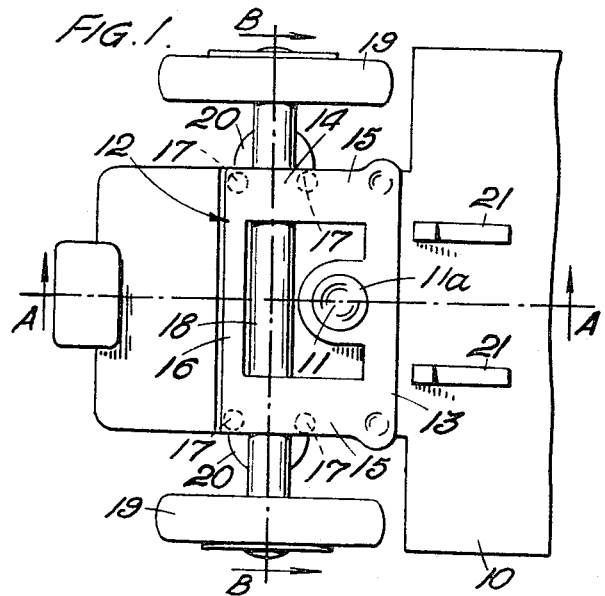
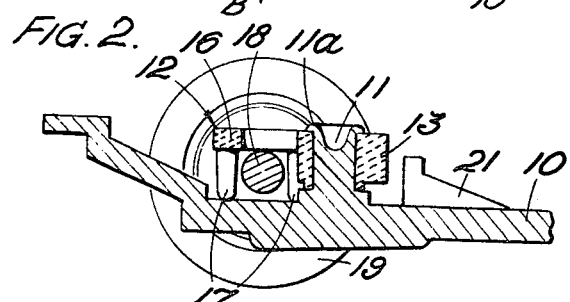
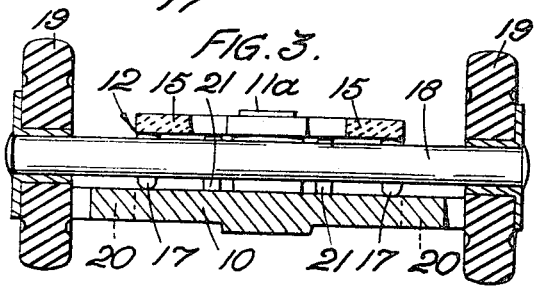

United States Patent Office 3,412,505
Patented Nov. 26, 1968

3,412,505
AXLE SUPPORT FOR TOY VEHICLES
Aubrey Robert Mills, London, England, assignor to Die Casting Machine Tools Limited, London, England, a British company
Filed Dec. 16, 1965, Ser. No. 514,282
Claims priority, application Great Britain, Feb. 22, 1965, 7,578/65
5 Claims. (Cl. 46—221)

ABSTRACT OF THE DISCLOSURE

A toy vehicle having a rigid base, an axle extending transversely across the base on the upper side thereof and carrying a wheel at each end, and a resilient plastic member rotatably secured to the base and having a portion straddling the axle to urge the axle resiliently down onto the base. The plastic member serves to hold the axle in position, to provide a resilient suspension therefor, and as a steering means for the vehicle.

---

The invention relates to toy vehicles.

According to this invention: in a toy vehicle there are provided a rigid base with an axle extending transversely across the base on the upper sides thereof, which axle carries a wheel at each end, and a resilient plastic member secured to said base and having a portion straddling the axle to urge the axle resiliently down onto the base whereby the plastic member serves both to hold the axle in position and to provide a resilient suspension.

The member of resilient material, conveniently a moulded plastic material, serves not only to hold the axle and as a suspension but acts also as a bearing in which the axle can rotate.

A feature of this invention is the provision of a resilient suspension which may support an axle that has to perform the task of steering the vehicle. It has hitherto been the practice to provide a spring suspension which is independent of the steering mechanism. This former type of arrangement may be fairly complex and tends to be expensive to produce. The present invention is therefore, in one aspect, directed to a simple form of support for a steering axle for a toy vehicle.

According to this aspect of the invention, an axle support for a toy vehicle comprises a member of resilient material adapted to be rotatably mounted so that a portion of the member may move over and above the base of the vehicle, said portion being adapted to retain resiliently an axle above said base.

With the present invention, the movable portion of the member of resilient material may not only support the axle so that the axle may be rotated to steer the vehicle, but may also bend upwardly away from the base so that the axle is at the same time resiliently mounted with respect to the vehicle. The resilient member may be mounted on a pivot extending upwardly from the base and may have a portion extending parallel to the base and have downwardly projecting lugs which retain the axle between the member and the base. In an unstressed position, the axle may rest on the base and be kept in position by the retaining lugs. If however, the base of the vehicle is depressed, the resilient member will bend upwardly so that the vehicle rests on the portion of the member which is in contact with the axle. Also, the axle may be placed in position or removed therefrom by bending the resilient member sufficiently to disengage the axle from the retaining lugs. This invention therefore provides an axle support which may combine the two functions of resiliently supporting the axle and rotating the axle. It would readily be possible to provide a steering mechanism which may move the resilient member in order to steer the wheels.

Projections or lugs may be provided on the base of the vehicle so as to limit the arcuate movement of the resilient member. The projecting lugs would thereby prevent the resilient member and hence the axle from moving too far in either direction of rotation: the base of the vehicle may have projections extending outwardly from the base plate near the normal location of the axle to prevent the wheels and axle from moving too far in an axial direction.

The projections that restrain the member from rotating may be located so that no rotation of the member is possible, so that a similar resilient member could be used as a resilient support for the wheels, more usually the rear wheels, of the toy vehicle which are not intended to be used for steering the vehicle.

In the following description reference will be made to the accompanying drawings in which FIGURE 1 is a plan view from above of part of the chassis of a toy vehicle;

FIGURE 2 is a sectional view along the centre line A—A of the part of the chassis shown in FIGURE 1; and FIGURE 3 is a sectional view on the centre line B—B through the axles shown in FIGURE 1.

Referring to the drawings: the chassis of the vehicle comprises a base plate 10 having at the centre of a narrower portion an upwardly extending lug 11 on which is rotatably mounted a resilient plate 12. The top of the lug is shaped to form a retaining flange 11a so as to retain the resilient member 12 in position. The plate 12 is generally rectangular, having a thicker portion 13 shaped to fit over the lug 11 and a thinner portion 14 comprising two arms 15 extending forwardly across the vehicle and connected by the arm 16. On the underside of each portion 15 are two pairs of projecting lugs 17, two lugs being arranged on either side of an axle 18 near each end thereof, the axle being thereby supported between the pairs of lugs 17 and the base plate 10. The axle 18 has at each end a wheel 19. Referring more particularly to FIGURE 1: the base member 10 has hemispherical portions 20 projecting outwardly in the region of the axles so as to bear against the inner sides of the wheels to limit their movement in an axial direction. The base plate 10 is provided with a pair of projecting ribs 21 arranged slightly rearwardly of the rear side of the resilient plate 12 so as to prevent the plate 12 from rotating more than a limited amount in either direction.

The plate 12 may typically be of nylon or similar resilient plastic material so as to allow the axle to move upwardly in order to resiliently support the axle.

The plate 12 may be connected to a suitable steering mechanism so that the alignment of the axle and thereby the wheels may be altered.

I claim:
1. In a toy vehicle:
  (a) a rigid base;
  (b) an axle extending transversely across the base on the upper side thereof, said axle carrying a wheel at each end;
  (c) a resilient plastic member rotatably mounted on said base, said resilient plastic member having a portion straddling the axle to urge the axle resiliently down onto the base and to displace the axle upon the rotation of said resilient plastic member, whereby said resilient plastic member serves to hold the axle in position, to provide a resilient suspension therefor and to provide a steering mechanism for said vehicle.
2. In a toy vehicle:

(a) a rigid base having a projecting pivot projecting therefrom;
(b) an axle extending transversely across the base on the upper side thereof, said axle carrying a wheel at each end;
(c) a resilient plastic member rotatably secured to said base, said resilient plastic member having an aperture therein forming a journal for said pivot and a portion straddling the axle to urge the axle resiliently down onto the base; and
(d) means for limiting the rotation of said resilient member, whereby said resilient plastic member serves to hold the axle in position, to provide a resilient suspension therefor and to provide a steering mechanism for said vehicle.

3. The structure as recited in claim 2 wherein said base is provided with a pair of upwardly projecting ribs spaced apart across the width of the base, said ribs serving to limit the rotation of said member.

4. The structure as recited in claim 3 wherein means are provided for limiting the axial movement of said axle.

5. In a toy vehicle:
(a) a rigid base, said base having a pivot projecting upwardly therefrom;
(b) an axle extending transversely across the base on the upper side thereof, said axle carrying a wheel at each end;
(c) a resilient plastic member secured to said base, said resilient plastic member being in the form of a plate and having an aperture forming a journal for said pivot;
  said resilient plastic member having two pairs of downwardly projecting lugs disposed to straddle said axle near each end;
(d) a pair of upwardly projecting ribs spaced apart across the width of said base, said ribs serving to limit the rotation of said resilient plastic member;
(e) a pair of hemispherical base portions extending outwardly from said base in the region of said axles, whereby each portion may bear against the inside of a wheel to prevent axial movement of said axle in one direction.

References Cited
UNITED STATES PATENTS

| | | | |
|---|---|---|---|
| 3,063,194 | 11/1962 | Berguerand | 46—201 |
| 3,280,500 | 10/1966 | Fairbairn | 46—201 |

LOUIS G. MANCENE, *Primary Examiner.*

C. R. WENTZEL, *Assistant Examiner.*